(12) United States Patent
Wei

(10) Patent No.: US 11,962,861 B2
(45) Date of Patent: Apr. 16, 2024

(54) LIVE STREAMING ROOM RED PACKET PROCESSING METHOD AND APPARATUS, AND MEDIUM AND ELECTRONIC DEVICE

(71) Applicant: BEIJING BYTEDANCE NETWORK TECHNOLOGY CO., LTD., Beijing (CN)

(72) Inventor: Li Wei, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 49 days.

(21) Appl. No.: 17/773,588

(22) PCT Filed: Aug. 4, 2020

(86) PCT No.: PCT/CN2020/106857
§ 371 (c)(1),
(2) Date: Apr. 29, 2022

(87) PCT Pub. No.: WO2021/082583
PCT Pub. Date: May 6, 2021

(65) Prior Publication Data
US 2022/0377426 A1    Nov. 24, 2022

(30) Foreign Application Priority Data
Oct. 29, 2019   (CN) .......................... 201911039396.X

(51) Int. Cl.
*H04N 21/478* (2011.01)
*H04N 21/2187* (2011.01)
(Continued)

(52) U.S. Cl.
CPC ..... *H04N 21/4784* (2013.01); *H04N 21/2187* (2013.01); *H04N 21/4316* (2013.01); *H04N 21/4788* (2013.01)

(58) Field of Classification Search
None
See application file for complete search history.

(56) References Cited

U.S. PATENT DOCUMENTS 10,992,988 B2 * 4/2021 Zhang ................. G06Q 20/065
2018/0160158 A1   6/2018 Liu et al.
2018/0300710 A1 * 10/2018 Wen ................... G06Q 20/3224

FOREIGN PATENT DOCUMENTS

CN      106355440 A    1/2017
CN      107122966 A    9/2017
(Continued)

OTHER PUBLICATIONS

International Patent Application No. PCT/CN2020/106857; Int'l Written Opinion and Search Report; dated Nov. 11, 2020; 8 pages.
(Continued)

Primary Examiner — Omar S Parra
(74) Attorney, Agent, or Firm — BakerHostetler

(57) ABSTRACT

A live broadcast room red envelope processing method and apparatus are provided. The method includes: receiving a red envelope sending instruction sent by a first audience client, where the red envelope sending instruction includes a red envelope receiving object, red envelope information and a target live broadcast room; determining red envelope content according to the red envelope information; sending, if the red envelope receiving object is all audiences in the target live broadcast room, a red envelope display instruction to all second audience clients in the target live broadcast room; receiving a red envelope receiving instruction sent by the second audience client in response to the red envelope display instruction; determining a target second audience client in response to the red envelope receiving instruction, and sending red envelope content to an audience account corresponding to the target second audience client.

11 Claims, 9 Drawing Sheets

Determine virtual currency amounts corresponding to all virtual gift types included in the red envelope information — 301

Determine a red envelope receiving sequence number section corresponding to each virtual gift included in the red envelope information, according to a descending order of the virtual currency amounts and a pre-set correspondence — 302

Randomly allocate the virtual gift included in each red envelope receiving sequence number section to red envelopes corresponding to by each red envelope receiving sequence number in the red envelope receiving sequence number section — 303

(51) Int. Cl.
     *H04N 21/431*       (2011.01)
     *H04N 21/4784*     (2011.01)
     *H04N 21/4788*     (2011.01)

(56) References Cited

FOREIGN PATENT DOCUMENTS

| | | |
|---|---|---|
| CN | 108810643 A | 11/2018 |
| CN | 109688477 A | 4/2019 |
| CN | 110753235 A | 2/2020 |
| WO | WO 2006/004382 A1 | 1/2006 |

OTHER PUBLICATIONS

"When live broadcast and red envelopes are combined, what kind of sparks will they collide?"; www.woshipm.com./it/785932.html; Shenzhen Juli Chuangxiang Information Technology Co. Ltd.; Sep. 2017; accessed Apr. 29, 2022; 15 pages.

\* cited by examiner

LIVE STREAMING ROOM RED PACKET PROCESSING METHOD AND APPARATUS, AND MEDIUM AND ELECTRONIC DEVICE

CROSS REFERENCE OF RELATED APPLICATION

The present application is a National phase application of PCT international patent application PCT/CN2020/106857, filed on Aug. 4, 2020 which claims the priority to Chinese Patent Application No. 201911039396.X, titled "LIVE BROADCAST ROOM RED ENVELOPE PROCESSING METHOD AND APPARATUS, MEDIUM AND ELECTRONIC DEVICE", filed on Oct. 29, 2019 with the State Intellectual Property Office of the PRC, both of which are incorporated herein by reference in their entireties.

FIELD

The present disclosure relates to the field of networks, and in particular to a live broadcast room red envelope processing method and apparatus, a medium and an electronic device.

BACKGROUND

The technology of live broadcast has been widely applied in the life of people. During a process of watching the live broadcast, an audience may interact with an anchor by sending a gift to the anchor, giving a thumb-up for the anchor or following the anchor. Accordingly, the anchor may interact with the audience by changing a class title of the audience in the live broadcast room. Practically, little interaction is performed between difference audiences in the live broadcast room. Presently, the audiences in the live broadcast room interact with each other only through chatting by words in a public screen. Therefore, the interaction between different audiences in the live broadcast room is monotonous.

SUMMARY

This section is provided to introduce the concept briefly, and the concept is described in detail in specific embodiments hereinafter. This section is neither intended to identity key features or necessary features of the claimed technical solutions, nor intended to limit scope of the claimed technical solutions.

In a first aspect, a live broadcast room red envelope processing method is provided. The method is applied to a server. The method includes:
  receiving a red envelope sending instruction sent by a first audience client, wherein the red envelope sending instruction includes a red envelope receiving object, red envelope information and a target live broadcast room where the first audience client is located;
  determining red envelope content according to the red envelope information;
  sending, in a case that it is determined that the red envelope receiving object is all the audiences in the target live broadcast room, a red envelope display instruction generated according to the red envelope content to all second audience clients of all the audiences in the target live broadcast room;
  receiving a red envelope receiving instruction sent by the second audience client in response to the red envelope display instruction; and
  determining a target second audience client in response to the red envelope receiving instruction, sending red envelope content to an audience account corresponding to the target second audience client, and sending the red envelope content to the target second audience client for displaying.

In a second aspect, a live broadcast room red envelope processing apparatus is further provided according to the present disclosure. The apparatus is applied to a server. The apparatus includes: a first receiving module, a determining module, a sending module, a second receiving module and a first processing module. The first receiving module is configured to receive a red envelope sending instruction sent by a first audience client, where the red envelope sending instruction includes a red envelope receiving object, red envelope information and a target live broadcast room where the first audience client is located. The determining module is configured to determine red envelope content according to the red envelope information. The sending module is configured to send, in a case that it is determined that the red envelope receiving object is all the audiences in the target live broadcast room, a red envelope display instruction generated according to the red envelope content to all second audience clients of all the audiences in the target live broadcast room. The second receiving module is configured to receive a red envelope receiving instruction sent by the second audience client in response to the red envelope display instruction. The first processing module is configured to determine a target second audience client in response to the red envelope receiving instruction, send red envelope content to an audience account corresponding to the target second audience client, and send the red envelope content to the target second audience client for displaying.

In a third aspect, a computer readable medium storing computer programs is provided according to the present disclosure. The programs are executed by a processor to perform the method described in the first aspect.

In a fourth aspect, an electronic device is provided according to the present disclosure. The electronic device includes: a memory storing computer programs; and a processor configured to execute the computer programs stored in the memory, to perform the method described in the first aspect.

According to the above technical solution, during a process of watching the live broadcast by the audience, the audience can interact with the anchor of the live broadcast room by sending a gift, and the audience can interact with other audiences in the live broadcast room via sending a live broadcast room red envelope. In addition, all other audiences in the live broadcast can participate in receiving the red envelope, thereby greatly enhancing interaction between the audiences in the live broadcast room and thus solving the problem of monotone interaction between the audiences in the live broadcast room in the conventional art.

Other features and advantages of the present disclosure are described in detail in specific embodiments hereinafter.

BRIEF DESCRIPTION OF THE DRAWINGS

With reference to the drawings and specific embodiments below, the above and other features, advantages and aspects of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

Term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
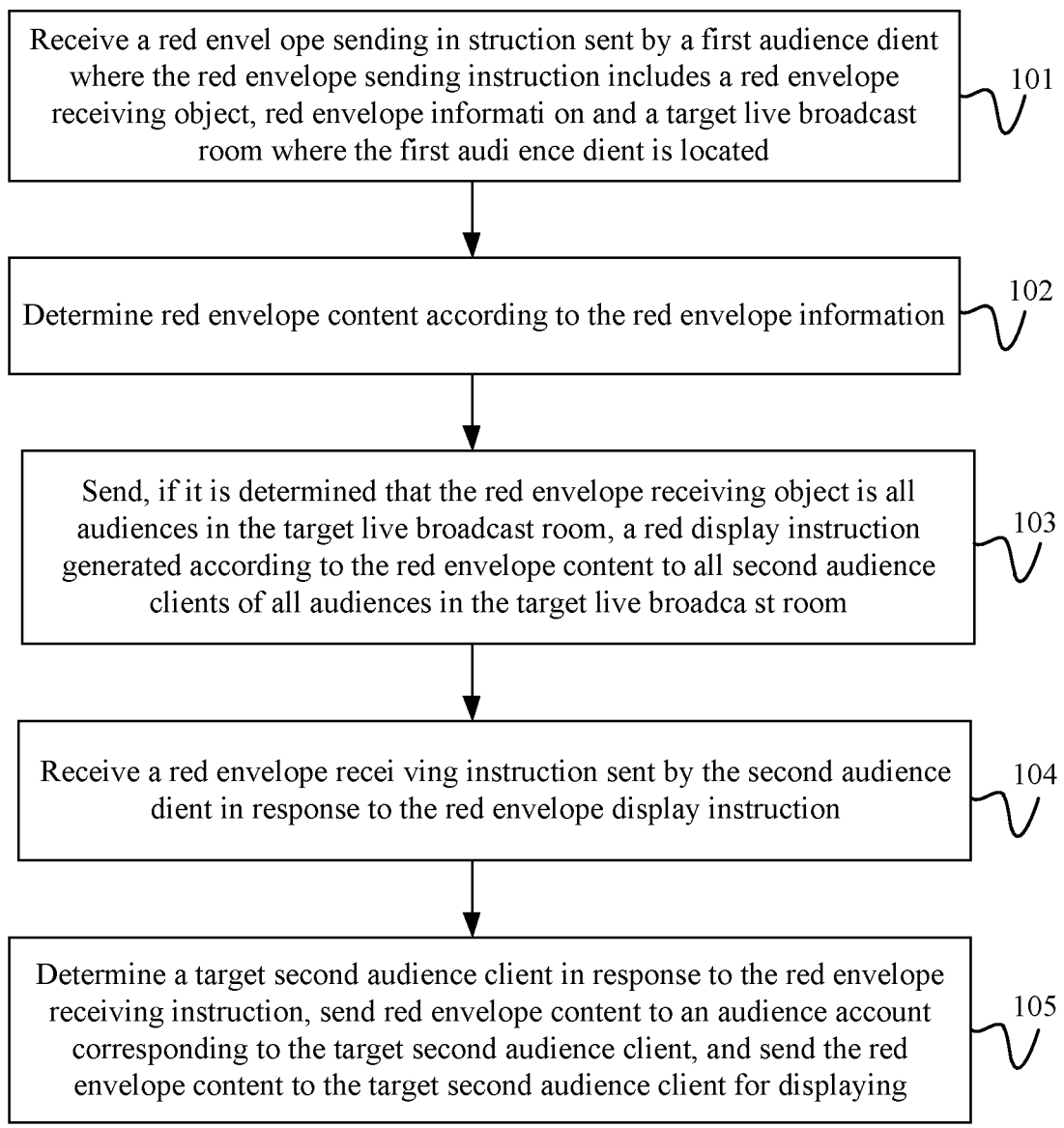
FIG. 1 is a flowchart of a live broadcast room red envelope processing method according to a schematic embodiment of the present disclosure.

FIG. 1 is a flowchart of a live broadcast room red envelope processing method according to a schematic embodiment of the present disclosure. As shown in FIG. 1, the method is applied to a server, and the method includes steps 101 to 105.

In step 101, a red envelope sending instruction sent by a first audience client is received. The red envelope sending instruction includes a red envelope receiving object, red envelope information and a target live broadcast room where the first audience client is located. The first audience client may be a client of any audience in the target live broadcast room. The red envelope receiving object may be an account for receiving the red envelope.

Figure 2B:
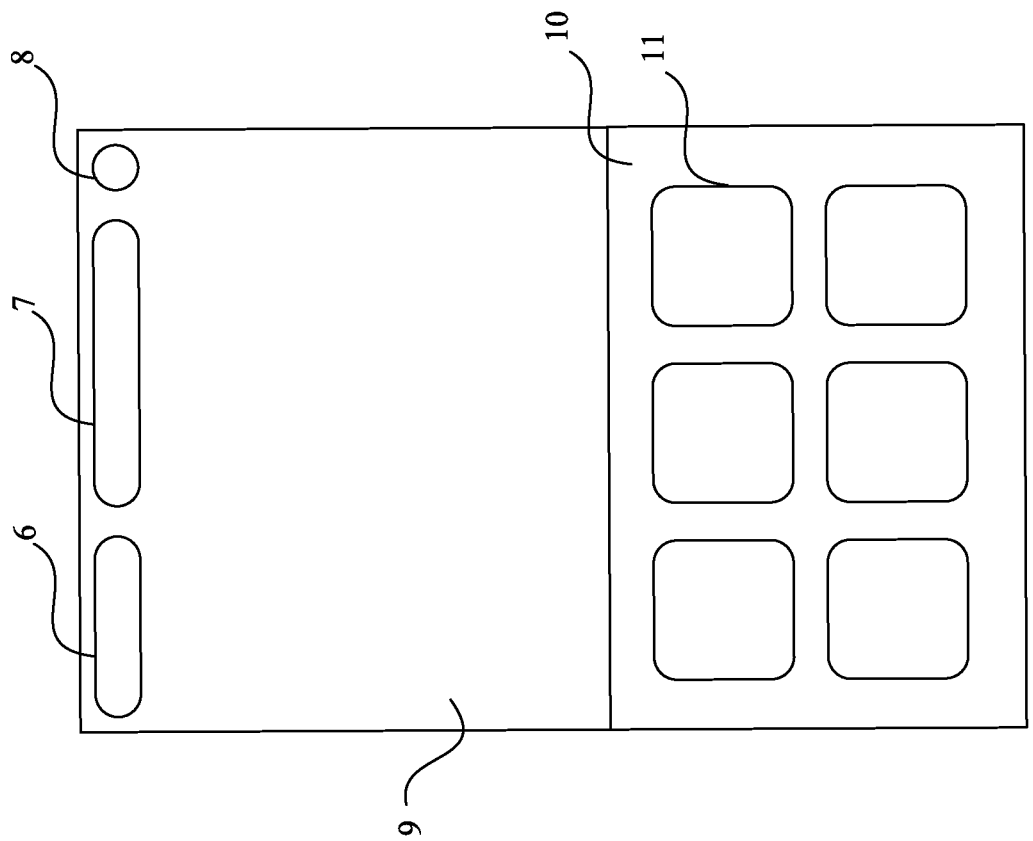
FIG. 2b is a schematic diagram of a display interface of a live broadcast room when a gift list pop-up window appears according to a schematic embodiment of the present disclosure.
Figure 2A:
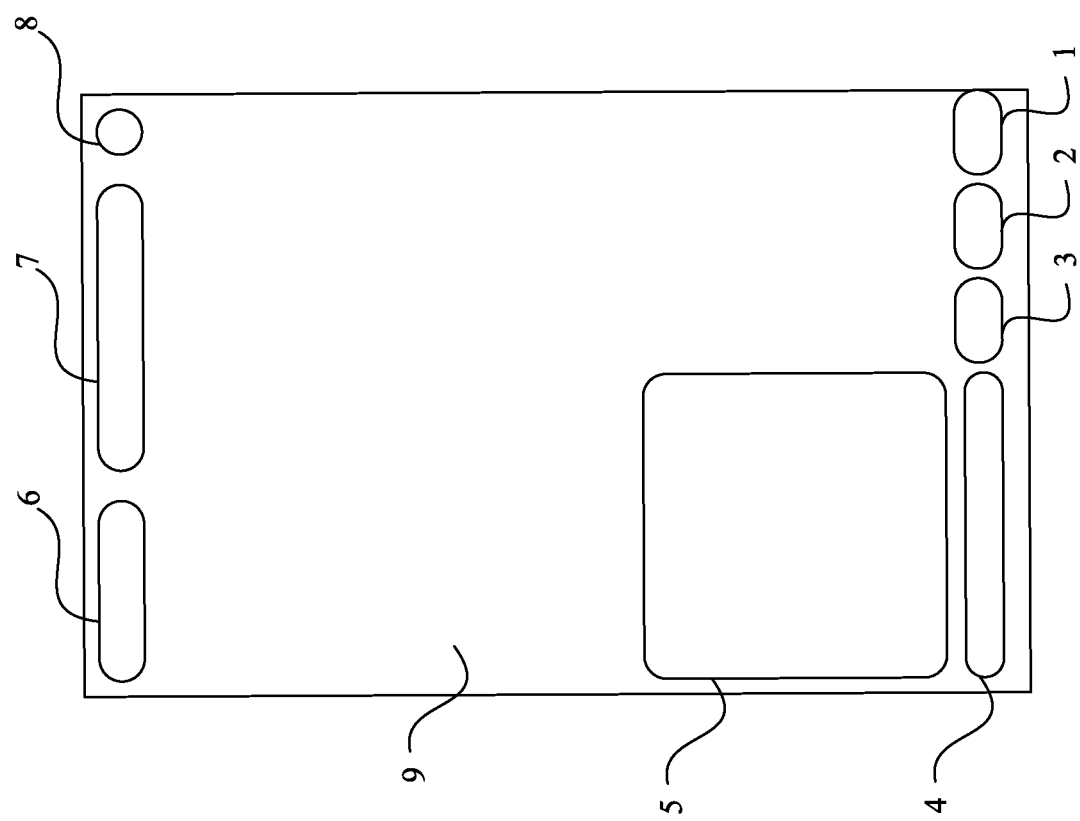
FIG. 2a is a schematic diagram of a display interface of a live broadcast room according to a schematic embodiment of the present disclosure.

When an audience corresponding to the first audience client watches the live broadcast in the target live broadcast room, the audience may trigger to send the red envelope sending instruction by any pre-set gesture. For example, a live broadcast interface which can be seen by the audience of the first audience client may be shown by FIG. 2a. FIG. 2a shows a display interface including nine interaction components: an interaction component 1 for clicking to send a gift, an interaction component 2 for clicking to recharge, an interaction component 3 for clicking to share the live broadcast room, an interaction component 4 for clicking to input words, an interaction component 5 for displaying live broadcast room chat information, an interaction component 6 for displaying anchor information, an interaction component 7 for displaying head portraits of a part of audiences in the live broadcast room, an interaction component 8 for clicking to leave the live broadcast room, and an interaction component 9 for playing a live broadcast video. When the audience needs to send a red envelope, the audience may click the interaction component 1 for clicking to send a gift, and the client jumps to a display interface shown in FIG. 2b. As shown in FIG. 2b, the display interface includes a gift list pop-up window 10 which may include a display page 11 of various virtual gifts and the red envelope. The audience may click the display page 11, to trigger an instruction for sending a corresponding virtual gift to the anchor, or trigger an instruction for sending a corresponding red envelope.

Figure 2C:
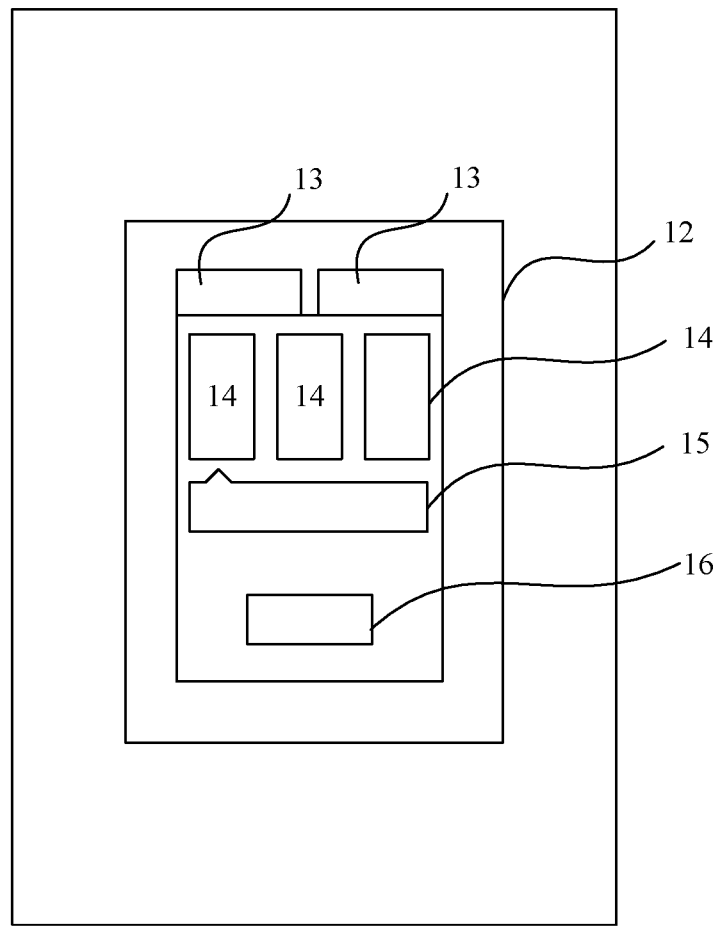
FIG. 2c is a schematic diagram of a display interface of a live broadcast room when a red envelope setting pop-up window appears according to a schematic embodiment of the present disclosure.

There may be multiple display pages 11 of the red envelope corresponding to different red envelope information. The audience may select different display pages 11 corresponding to different envelopes to trigger red envelope sending instructions including different red envelope information. Alternatively, there may be only one display page 11 of the red envelope. In this case, when the audience selects the display page 11 of the red envelope, a red envelope setting pop-up window 12 as shown in FIG. 2c appears. The audience may select different red envelope information in the red envelope setting pop-up window 12, and manually triggers to send the red envelope sending instruction after selection. The multiple display pages 11 of the red envelope may correspond to different red envelope receiving objects. In a case that there is only one display page 11 of the red envelope, the audience may set the red envelope receiving object in a red envelope setting pop-up window 12 shown in FIG. 2c. The manner for setting the red envelope receiving object by the audience in the red envelope setting pop-up window 12 in FIG. 2c is not shown in FIG. 2c. The display interface when the audience sets the red envelope receiving object in the first audience client is not limited herein.

The red envelope information in the red envelope setting pop-up window 12 may be set by default, as shown in FIG. 2c. The audience may directly select the set red envelope information. The display interface shown in FIG. 2c includes an interaction component 13, an interaction component 14, and a display component 15. The interaction component 13 is configured to select a red envelope type. The red envelope includes a random red envelope and an aliquot red envelope. The interaction component 14 is configured to select red envelope content. FIG. 2c shows three interaction components 14 corresponding to different red envelop content. The display component 15 is configured to display red envelope content corresponding to the interaction component 14 selected by the audience through characters or icons. A shape of the display component 15 may change according to a position of the interaction component 14 selected by the audience, to represent that the red envelope content displayed by the display component 15 corresponds to the interaction component 14 selected by the audience. The red envelope content corresponding to the interaction component 14 may be related to the interaction component 13 selected by the audience, that is, being related to the red envelope type selected by the audience. For example, when the audience selects the interaction component 13 at the left side, for example the random red envelope, the three interaction components 14 respectively correspond to red envelope contents A, B and C. When the audience selects the interaction component 13 at the red side, for example the aliquot red envelope type, the three interaction components 14 respectively correspond to red envelope contents D, E and F. The red envelope content may include: for example, a type of virtual gift, the number of virtual gift, a virtual currency amount, and the number of red envelope. After completing selection in the default setting of multiple types of red envelope information, the audience may click the interaction component 16 to trigger to send the red envelope sending instruction.

The red envelope information in the red envelope setting pop-up window 12 may be configured by the audience. For example, besides selecting the red envelope type, the audience may set other red envelope information in the red envelope setting pop-up window 12. For example, the audience may set the red envelope information to include only the type of the virtual gift and the number of types, or set the red envelope information to include only the virtual currency amount, or set the red envelope information to include the type of the virtual gift, the number of types and the virtual currency amount. The audience may add the type of the virtual gift, the number of the virtual gift and the virtual currency amount by a pull-down list or manual inputting, and the adding manner is not limited in the present disclosure. The number of red envelope may also be set by the audience. After selecting the red envelope information, the audience may click the interaction component 16 shown in FIG. 2c to trigger to send the red envelope sending instruction. The red envelope type, the number of red envelope, the virtual currency amount, the type of the virtual gift and the number of the virtual gift included in the red envelope information may be set to be a default value before the audience performs selection, so that the audience can set the red envelope information more intuitively and conveniently.

In step 102, red envelope content is determined according to the red envelope information.

The red envelope information may include: for example, a type of the virtual gift, the number of the virtual gift, a virtual currency amount, the number of red envelope, and a red envelope type. The red envelope type may include a random red envelope or an aliquot red envelope. Therefore, the red envelope content may be determined according to the red envelope information in a following manner. First, the number of the red envelope is determined. For example, the number of the red envelope may be 10. Then, a red envelope type is determined. For example, the red envelope type may be an aliquot red envelope. When the red envelope type is determined, a specific amount in each red envelope is determined. For example, in a case that the red envelope information includes only the virtual currency amount and the virtual currency amount is 200 diamond (diamond is a unit of the virtual currency), the red envelope corresponding to the above red envelope information includes 10 aliquot red envelopes each containing 20 diamond virtual currency.

In step 103, in a case that it is determined that the red envelope receiving object is all audiences in the target live broadcast room, a red envelope display instruction generated according to the red envelope content is sent to all second audience clients of all audiences in the target live broadcast room.

The red envelope receiving object may be a red envelope receiving object corresponding to a red envelope selected by the audience by default when the first audience client triggers the red envelope sending instruction. For example, the audience selects a display page 11 corresponding to a red envelope in the gift list pop-up window 12 of the first audience client shown in FIG. 2b, to trigger the red envelope sending instruction. A red envelope receiving object corresponding to the selected display page 11 is all audiences in the target live broadcast room. In an embodiment, the red envelope receiving object may be set by the audience when the audience sets red envelope information in the red envelope sending instruction, or the red envelope receiving object may be set by a pull-down menu or checking when the audience of the first audience client sets the red envelope information in the red envelope sending instruction.

In step 102, after the red envelope content is determined according to the red envelope information, a red envelope display instruction may be generated according to the red envelope content, so that an audience of the client receiving the red envelope display instruction can receive one or more red envelopes in response to the red envelope display instruction.

In a possible implementation, when the red envelope display instruction generated according to the determined red envelope content in step 102 is sent to all second audience clients of all audiences in the target live broadcast room, the same audience in the target live broadcast room may be in a login state in multiple different audience clients and watches the live broadcast in the live broadcast room. Therefore, the multiple audience clients corresponding to the same audience in the target live broadcast room are included in the second audience client. The second audience client may further include a first audience client sending the red envelope instruction. That is, the audience sending the red envelope can receive the envelope sent by the audience himself in the target live broadcast room.

In step 104, a red envelope receiving instruction sent by the second audience client in response to the red envelope display instruction is received. When receiving the red envelope display instruction, the second audience client may receive the red envelope sent by the audience of the first audience client. The manner of receiving the red envelope and the manner of displaying the red envelope in the second audience client are not limited herein, as long as the red envelope receiving instruction fed back by the second audience client can be received.

In step 105, a target second audience client is determined in response to the red envelope receiving instruction, red envelope content is sent to an audience account corresponding to the target second audience client, and the red envelope content is sent to the target second audience client for displaying.

The target second audience client may be determined according to an order of receiving the red envelope receiving instruction. After the target second audience client is determined in the second audience client, the red envelope content determined in step 102 is sent. For example, if the red envelope content includes 10 aliquot red envelopes, the 10 second audience clients who receive the red envelope receiving instruction earliest, are determined as the target second audience clients, and the 10 aliquot red envelopes are sent to audience accounts corresponding to the target second audience clients. If the red envelope content includes 3 random red envelopes, the 3 second audience clients who receive the red envelope receiving instruction earliest, are determined as the target second audience client, and the 3 random red envelopes are sent to the target second audience clients according to a default order. The default order may be defined as follows: the target second audience client who receives the red envelope receiving instruction earlier corresponds to a smaller red envelope sequence number.

In a possible implementation, audience accounts corresponding to the target second audience client include no repeated audience accounts. For example, in the scene that the red envelope content includes 10 aliquot red envelopes, if the audience accounts corresponding to the 10 second audience clients who receive the red envelope receiving instruction earliest include repeated accounts, determination is performed on one or more red envelope receiving instructions after the 10 red envelope receiving instruction received earliest, until the audience accounts corresponding to the determined 10 target second audience clients include no repeated audience account. In this way, a case that the same audience account logs in multiple different clients simultaneously to maliciously increase red envelope receiving probability can be avoided, and thus the same audience account can receive only one red envelope for one red envelope display instruction.

The red envelope content is sent to the target second audience client for displaying, so that the audience of the target second audience client who successfully receives the red envelope can intuitively see content of the received red envelope. The manner for displaying the red envelope content in the target second audience client is not limited in the present disclosure. In addition, receiving states of all red envelopes may be sent to all second audience clients of all audiences in the target live broadcast room, thereby facilitating seeing the receiving states of the red envelopes by all audiences in the target live broadcast room.

In a possible implementation, when the red envelope sending instruction is received, corresponding virtual currency and/or virtual gifts may be deducted from the audience account of the first audience client according to the red envelope information in the red envelope sending instruction.

According to the above technical solution, during a process of watching the live broadcast by the audience, the audience can interact with the anchor of the live broadcast room by sending a gift, and the audience can interact with other audiences in the live broadcast room via sending a live broadcast room red envelope. In addition, all other audiences in the live broadcast can participate in receiving the red envelope, thereby greatly enhancing interaction between the audiences in the live broadcast room and thus solving the problem of monotone interaction between the audiences in the live broadcast room in the conventional art.

Figure 3:
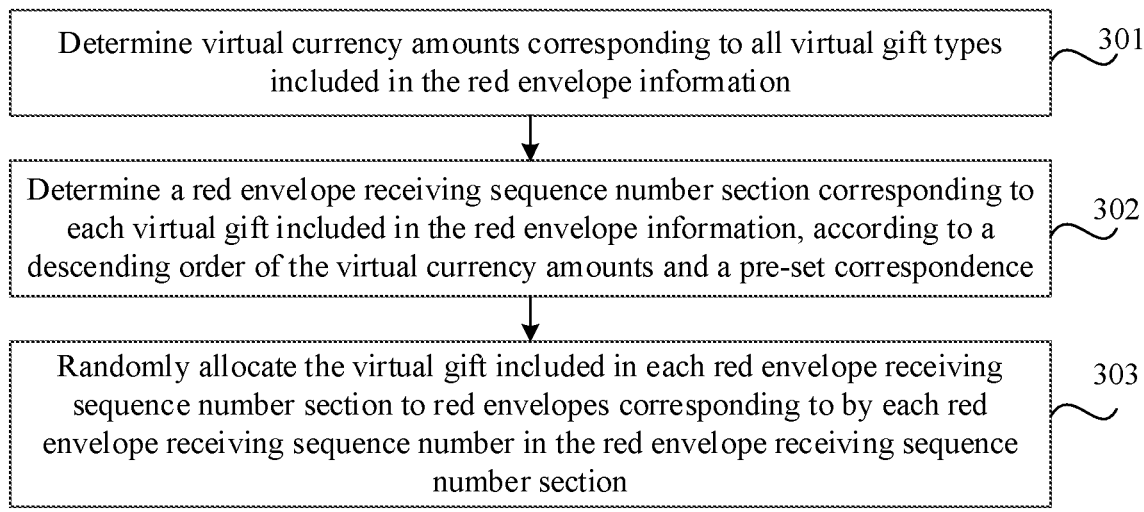
FIG. 3 is a flowchart of determining red envelope content according to red envelope information in the live broadcast room red envelope processing method according to a schematic embodiment of the present disclosure.

FIG. 3 is a flowchart of determining red envelope content according to red envelope information in the live broadcast room red envelope processing method according to a schematic embodiment of the present disclosure. The red envelope information includes: a type of virtual gift, the number of virtual gift, and/or a virtual currency amount, as well as the number of red envelope and a red envelope type. The red envelope type includes a random red envelope and an aliquot red envelope. As shown in FIG. 3, in a case that the number of red envelope is more than one, the red envelope type is a random red envelope and the red envelope information includes virtual gifts, the method includes step 301 to 303.

In step 301, a virtual currency amount corresponding to all virtual gift types included in the red envelope information is determined.

In step 302, according to a descending order of the virtual currency amounts and a pre-set correspondence, a red envelope receiving sequence number section corresponding to each virtual gift included in the red envelope information is determined. A virtual gift with a greater virtual currency amount corresponds to a red envelope receiving sequence number section with a smaller average sequence number. The red envelope receiving sequence number represents an order of receiving the red envelope, and each red envelope receiving sequence number corresponds to one red envelope. The pre-set correspondence indicates a correspondence between the virtual currency amounts ranked in a descending order and the red envelope receiving sequence number sections. The red envelope receiving sequence number sections are generated according to the number of red envelopes in the red envelope information.

For example, in a case that the number of red envelope in the red envelope information is 15, the red envelope receiving sequence number sections may be generated according to the following rule. A first red envelope receiving sequence number section includes a first to a third red envelope; a second red envelope receiving sequence number section includes a first to a fifth red envelope; and a third red envelope receiving sequence number section includes a first to a fifteenth red envelope. It is assumed that the red envelope information includes a total of 20 virtual gifts. The virtual currency amounts are ranked in a descending order, and the red envelope receiving sequence number sections corresponding to the all virtual gifts may be determined according to a following correspondence: the virtual gifts ranked front 10% are grouped into a first red envelope receiving sequence number section, the virtual gifts ranked 11% to 20% are grouped into a second red envelope receiving sequence number section; and the virtual gifts ranked 21% to 100% are grouped into a third red envelope receiving sequence number section. Therefore, if the number of the virtual gifts is 20, one virtual gift with a highest virtual currency amount is grouped into the first red envelope receiving sequence number section, and at least one of the three red envelopes received earliest includes a virtual gift corresponding to the highest virtual currency amount. One virtual gift with a second highest virtual currency amount is grouped into the second red envelope receiving sequence number section. That is, not only at least one of the three red envelopes received earliest includes the virtual gift corresponding to the highest virtual currency amount, but also at least one of the five red envelopes received earliest includes a virtual gift corresponding to the second highest virtual currency amount. The virtual gifts with the highest virtual currency amount and the second highest virtual currency amount may be located in a same red envelope or may be located in different red envelopes. The remaining 18 virtual gifts are grouped into the third red envelope receiving sequence number section. That is, the 15 red envelopes each may include the remaining 18 virtual gifts.

In step 303, the virtual gifts included in each red envelope receiving sequence number section are randomly allocated to red envelopes corresponding to each red envelope receiving sequence number in the red envelope receiving sequence number section. In the scene that the number of red envelopes is 15, the virtual gift with the highest virtual currency amount is randomly allocated to three red envelopes to be received earliest, the virtual gift with the second highest virtual currency amount is randomly allocated to five red envelopes to be received earliest, and remaining 18 virtual gifts are randomly allocated to the fifteen red envelopes. When all the gifts are allocated, multiple virtual gifts may be allocated to some of the fifteen red envelopes, the virtual gift with the highest virtual currency amount is allocated to any one of three red envelopes to be received earliest, and the virtual gift with the second highest virtual currency amount is allocated to any one of five red envelopes to be received earliest.

According to the above technical solution, randomness of the virtual gifts included in the red envelope can be ensured to a maximum extent. Even if the same virtual gift and the same number of red envelope are sent each time, it can be ensured that the virtual gifts are not allocated to the same red envelope, thereby greatly improving experience of the audiences for the randomness of the red envelopes.

In a possible implementation, in a case that the number of red envelopes is more than one, the red envelopes type is a random red envelope, and the red envelope information includes a virtual currency amount, the process of determining red envelope content according to the red envelope information includes: randomly allocating virtual currency to red envelopes according to the virtual currency amounts. The red envelope information may include not only the virtual currency amount, but also a type of the virtual gift and the number of virtual gift. The virtual currency and the virtual gifts may be randomly allocated to various red envelopes. That is, a random allocation result of the virtual currency in the red envelopes does not affect a random allocation result of the virtual gifts in the red envelopes.

Figure 4:
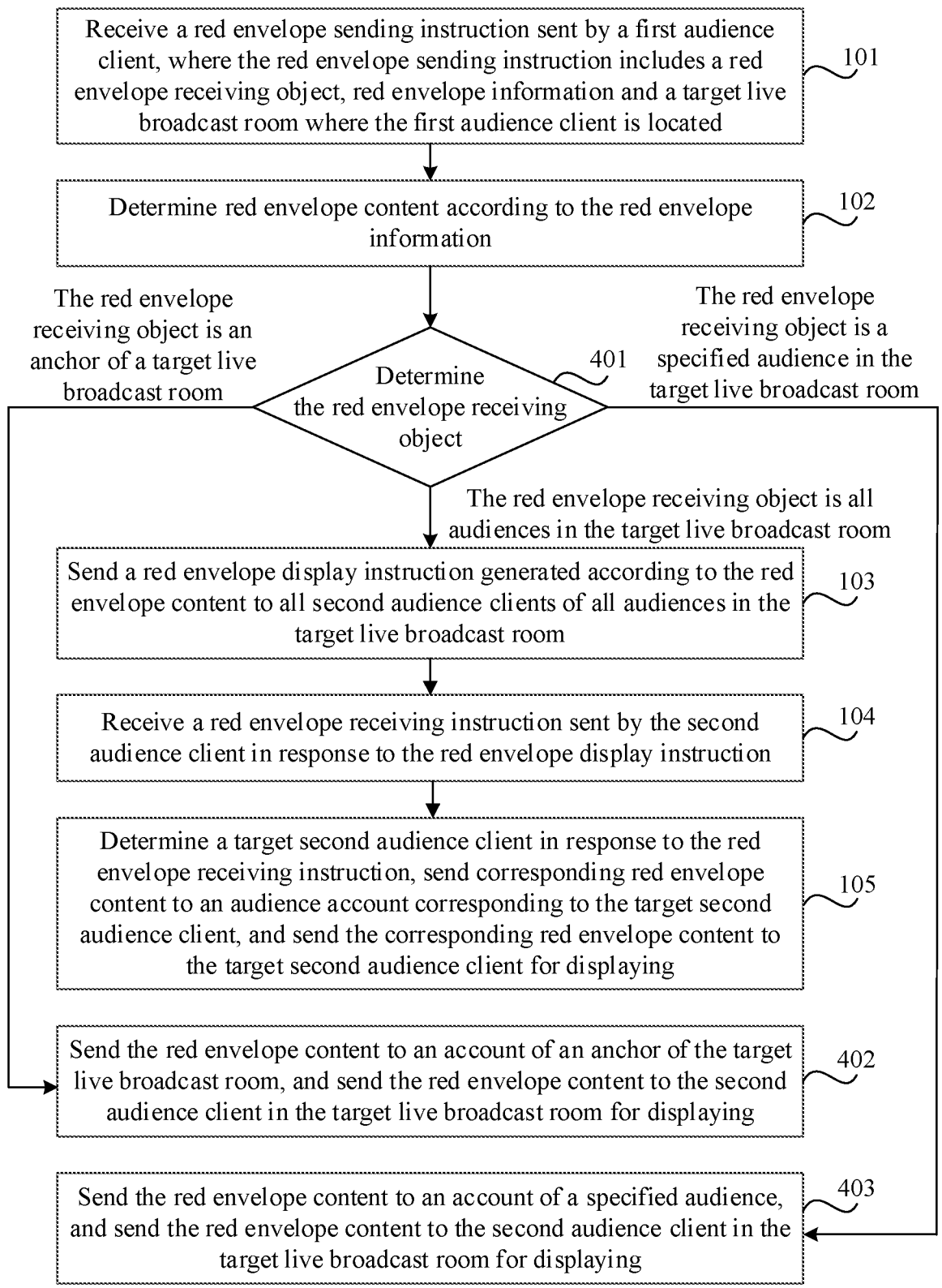
FIG. 4 is a flowchart of a live broadcast room red envelope processing method according to a schematic embodiment of the present disclosure.

FIG. 4 is a flowchart of a live broadcast room red envelope processing method according to another schematic embodiment of the present disclosure. As shown in FIG. 4, the method further includes steps 401 to 403.

In step 401, a red envelope receiving object in the red envelope sending instruction is determined. In a case that the red envelope receiving object is all audiences in the target live broadcast room, the method proceeds to step 103; in a case that the red envelope receiving object is an anchor of the target live broadcast room, the method proceeds to step 402; and in a case that the red envelope receiving object is a specified audience in the target live broadcast room, the method proceeds to step 403.

In step 402, the red envelope content is sent to an account of the anchor of the target live broadcast room, and the red envelope content is sent to the second audience client in the target live broadcast room for displaying. That is, the audience in the target live broadcast room may send a gift to the anchor of the live broadcast room via a red envelope. After receiving the red envelope sending instruction, the server may directly send the determined red envelope content to the account of the anchor of the target live broadcast room, and send the determined red envelope content to all second audience clients of all audiences in the target live broadcast room, so that all audiences in the target live broadcast room can see the red envelop content sent to the anchor of the live broadcast room from the audience of the first audience client.

In step 403, the red envelope content is sent to an account of the specified audience, and the red envelope content and a nickname of the specified audience are sent to the second audience client in the target live broadcast room for displaying. That is, one audience in the target live broadcast room may send a gift to another audience in the target live broadcast room via a form of red envelope. After receiving the red envelope sending instruction, the server may directly send the determined red envelope content to the account of the specified audience, and send the red envelope content and the nickname of the specified audience to all second audience clients of all audiences in the target live broadcast room for displaying, so that all audiences in the target live broadcast room can see the red envelope content sent to the specified audience from the audience of the first audience client and the nickname of the specified audience.

In a possible embodiment, the red envelope display instruction generated according to the red envelope content includes red envelope receiving waiting time. The red envelope receiving waiting time indicates a time period ranging from a time instant when the second audience client receives the red envelope display instruction to a time instant when the second audience client sends the red envelope receiving instruction in response to input of the audience. The red envelope receiving waiting time may be set by the audience of the first audience client, or may be default red envelope receiving waiting time for the server. When the red envelope display instruction is received, the second audience client may display a picture of a red envelope to be received in the current live broadcast display interface, and display the red envelope receiving waiting time on or around the picture of the red envelope in a form of words or animation. The red envelope receiving waiting time may be displayed in a varying countdown form, to prompt the audience watching the target live broadcast room how soon the red envelope can be received. The second audience client can receive an operation for triggering a red envelope receiving instruction from the audience only when the red envelope receiving waiting time expires.

Figure 5:
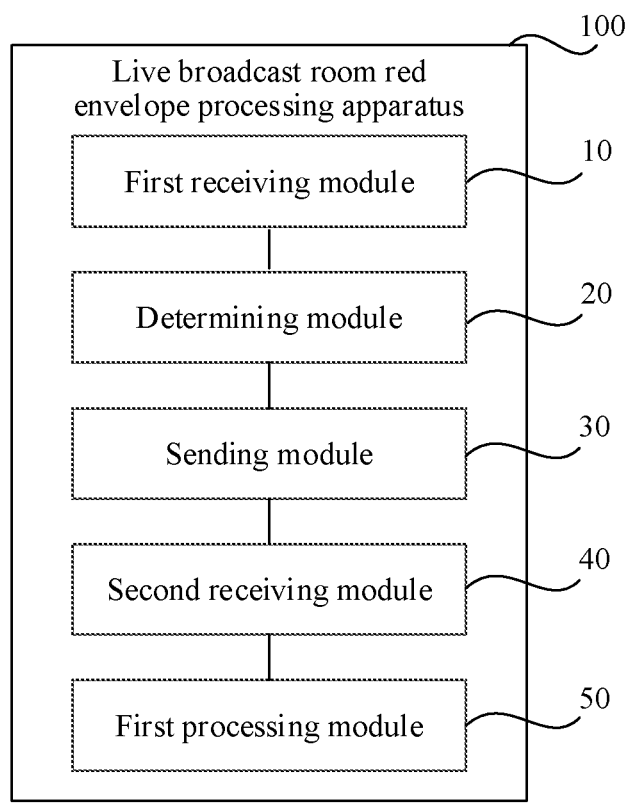
FIG. 5 is a structural block diagram of a live broadcast room red envelope processing apparatus according to a schematic embodiment of the present disclosure.

FIG. 5 is a structural block diagram of a live broadcast room red envelope processing apparatus 100 according to a schematic embodiment of the present disclosure. As shown in FIG. 5, the apparatus 100 is applied to a server. The apparatus 100 includes: a first receiving module 10, a determining module 20, a sending module 30, a second receiving module 40 and a first processing module 50. The first receiving module 10 is configured to receive a red envelope sending instruction sent by a first audience client. The red envelope sending instruction includes: a red envelope receiving object, red envelope information and a target live broadcast room where the first audience client is located. The determining module 20 is configured to determine red envelope content according to the red envelope information. The sending module 30 is configured to send, if it is determined that the red envelope receiving object is all audiences in the target live broadcast room, a red envelope display instruction generated according to the red envelope content to all second audience clients of all audiences in the target live broadcast room. The second receiving module 40 is configured to receive a red envelope receiving instruction sent by the second audience client in response to the red envelope display instruction. The first processing module 50 is configured to determine a target second audience client in response to the red envelope receiving instruction, send red envelope content to an audience account corresponding to the target second audience client, and send the red envelope content to the target second audience client for displaying.

According to the above technical solution, during a process of watching the live broadcast by the audience, the audience can interact with the anchor of the live broadcast room by sending a gift, and the audience can interact with other audiences in the live broadcast room via sending a live broadcast room red envelope. In addition, all other audiences in the live broadcast can participate in receiving the red envelope, thereby greatly enhancing interaction between the audiences in the live broadcast room and thus solving the problem of monotone interaction between the audiences in the live broadcast room in the conventional art.

Figure 6:
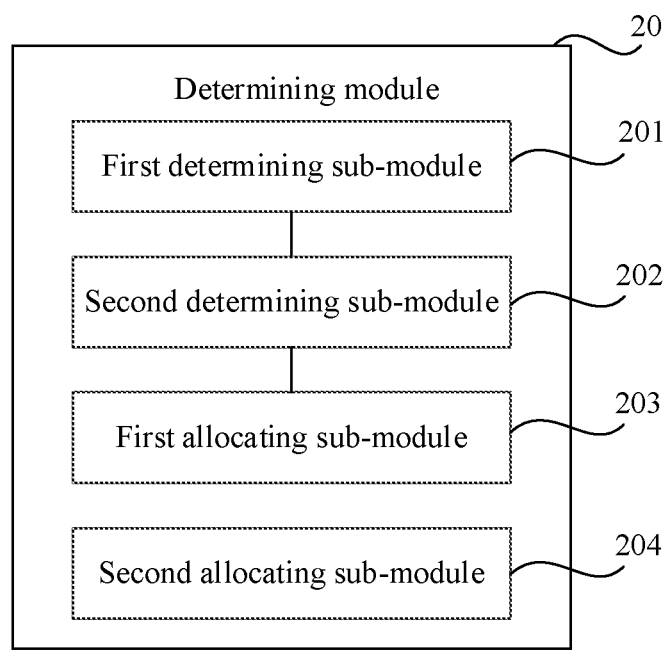
FIG. 6 is a schematic structural diagram of a determining module of the live broadcast room red envelope processing apparatus according to another schematic embodiment of the present disclosure.

FIG. 6 is a schematic structural diagram of the determining module 20 of the live broadcast room red envelope processing apparatus 100 according to a schematic embodiment of the present disclosure. The red envelope information includes: a type of virtual gift, the number of the virtual gift, a virtual currency amount, the number of red envelope and a red envelope type. The red envelope type includes a random red envelope and an aliquot red envelope. In a case that the number of red envelopes is more than one, the red envelope type is a random red envelope and the red envelope information includes the virtual gift, the determining module 20 includes a first determining sub-module 201, a second determining sub-module 202, and a first allocating sub-module 203, as shown in FIG. 6. The first determining sub-module 201 is configured to determine virtual currency amounts corresponding to all virtual gift types included in the red envelope information. The second determining sub-module 202 is configured to determine, according to a descending order of the virtual currency amounts and a pre-set correspondence, a red envelope receiving sequence number section corresponding to each virtual gift included in the red envelope information. A virtual gift with a greater virtual currency amount corresponds to a red envelope receiving sequence number section with a smaller average sequence number. The red envelope receiving sequence number represents an order of receiving the red envelopes, and each red envelope receiving sequence number corresponds to one red envelope. The pre-set correspondence indicates a correspondence between the virtual currency amounts ranked in a descending order and the red envelope receiving sequence number sections. The red envelope receiving sequence number sections are generated according to the number of red envelopes included in the red envelope information. The first allocating sub-module 203 is configured to randomly allocate the virtual gifts included in each red envelope receiving sequence number section to the red envelopes corresponding to each red envelope receiving sequence number in the red envelope receiving sequence number section.

In a possible implementation, in a case that the number of red envelopes is more than one, the red envelope type is a random red envelope and the red envelope information includes the virtual currency amount, the determination module further includes a second allocating sub-module 204, as shown in FIG. 6. The second allocating sub-module 204 is configured to randomly allocate the virtual currency amounts to the red envelopes.

According to the above technical solution, randomness of the virtual gifts included in the red envelope can be ensured to a maximum extent. Even if the same virtual gift and the same number of red envelope are sent each time, it can be ensured that the virtual gifts are not allocated to the same red envelope, thereby greatly improving experience of the audiences for the randomness of the red envelopes.

Figure 7:
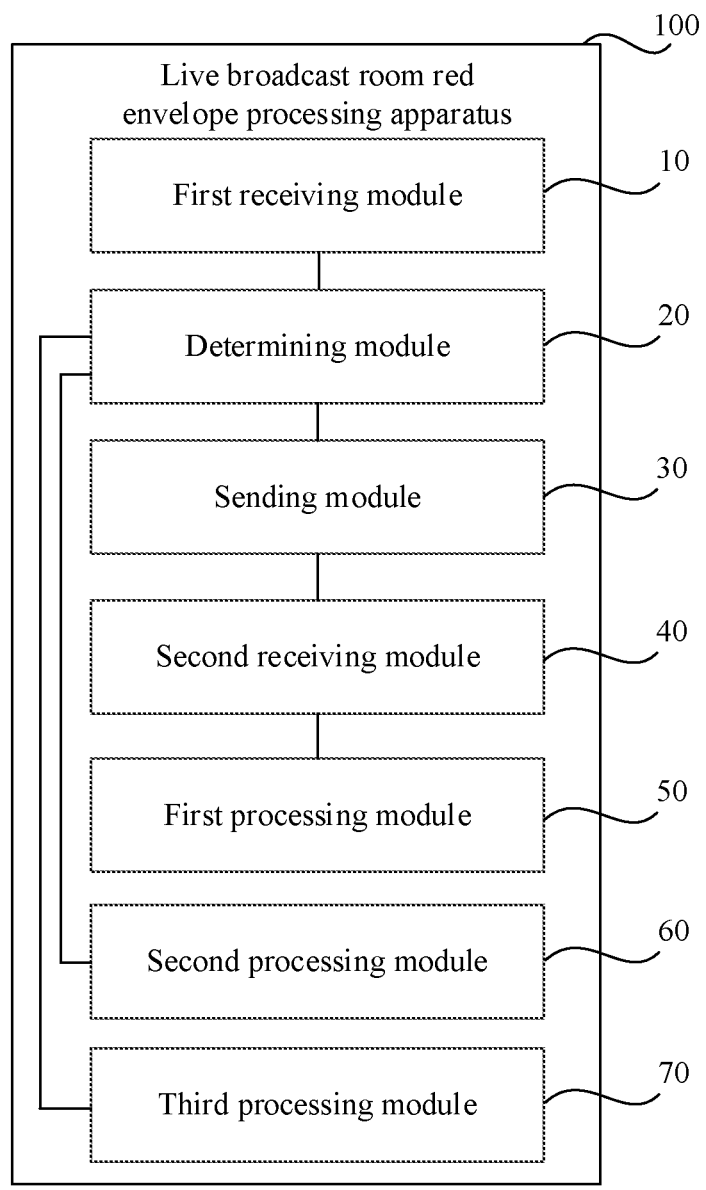
FIG. 7 is a structural block diagram of a live broadcast room red envelope processing apparatus according to another schematic embodiment of the present disclosure.

FIG. 7 is a structural block diagram of a live broadcast room red envelope processing apparatus 100 according to another schematic embodiment of the present disclosure. As shown in FIG. 7, the apparatus 100 further includes a second processing module 60. The second processing module 60 is configured to, in a case that it is determined that the red envelope receiving object is an anchor of the target live broadcast room, send the red envelope content to an account of the anchor of the target live broadcast room, and send the red envelope content to the second audience client in the target live broadcast room for displaying.

In a possible implementation, as shown in FIG. 7, the apparatus 100 further includes a third processing module 70. The third processing module 70 is configured to, in a case that the red envelope receiving object is a specified audience in the target live broadcast room, send the red envelope content to an account of the specified audience, and send the red envelope content and a nickname of the specified audience to the second audience client in the target live broadcast room for displaying.

In a possible implementation, the red envelope display instruction generated according to the red envelope content includes red envelope receiving waiting time. The red envelope receiving waiting time indicates a time period ranging from a time instant when the second audience client receives the red envelope display instruction to a time instant when the second audience client sends the red envelope receiving instruction in response to input of the audience.

Figure 8:
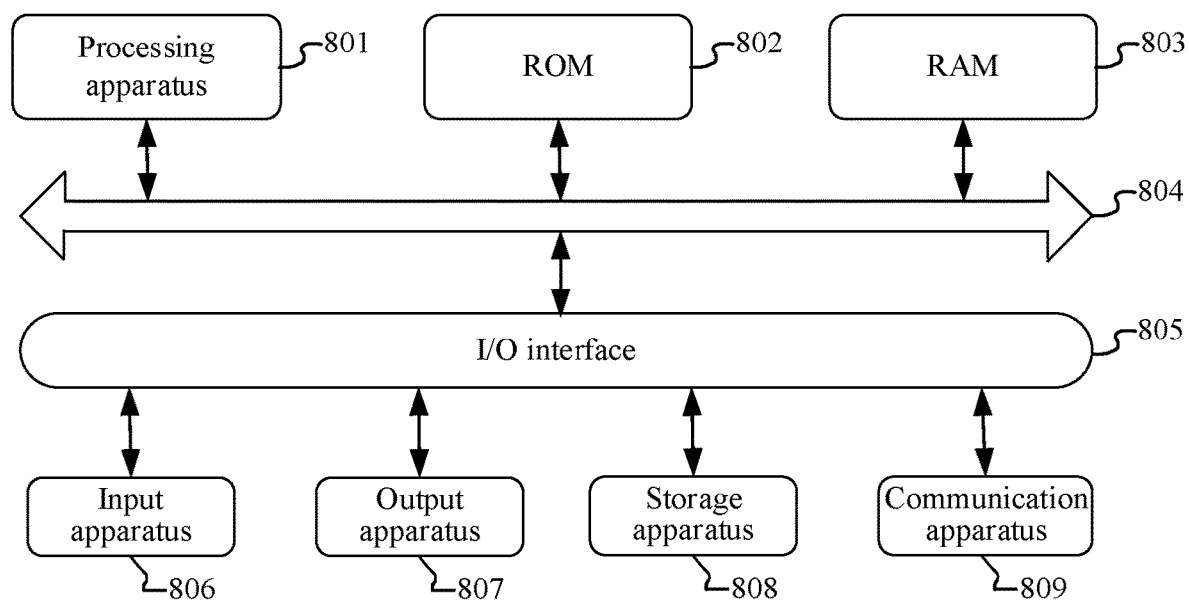
FIG. 8 is a schematic structural diagram of an electronic device according to a schematic embodiment of the present disclosure.

Reference is made to FIG. 8 which shows a schematic structural diagram of an electronic device 800 for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 8 is schematic, and is not intended to limit functions and scope of the embodiments of the present disclosure.

As shown in FIG. 8, the electronic device 800 may include a processing apparatus (such as a central processor and a graphic processor) 801. The processing apparatus may perform various appropriate actions and processing by executing programs stored in a read-only memory (ROM) 802 or programs uploaded from a storage apparatus 808 to a random access memory (RAM) 803. Various programs and data required for operations of the electronic device 800 are also stored in the RAM 803. The processing apparatus 801, the ROM 802 and the RAM 803 are connected to each other through the bus 804. An input/output (I/O) interface 805 is also connected to the bus 804.

Generally, the following components are connected to the I/O interface 805: an input apparatus 806 such as a touch screen, a touch panel, a keyboard, a mouse, a camera, a microphone, an accelerometer, and gyroscope; an output apparatus 807 such as a liquid crystal display (LCD), a loudspeaker and a vibrator; a storage apparatus 808 such as a magnetic tape and a hard disk; and a communication apparatus 809. The communication apparatus 809 may allow the electronic device 800 to communicate with other device in a wired or wireless manner to exchange data. Although FIG. 8 shows the electronic device 800 provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 809, installed from the storage apparatus 808 or installed from the ROM 802. The computer program is executed by the processing apparatus 801 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. When the one or more programs are executed by the electronic device, the electronic device is instructed to perform the following operations: receiving a red envelope sending instruction sent by a first audience client, where the red envelope sending instruction includes a red envelope receiving object, red envelope information and a target live broadcast room where the first audience client is located; determining red envelope content according to the red envelope information; sending, in a case that it is determined that the red envelope receiving object is all the audiences in the target live broadcast room, a red envelope display instruction generated according to the red envelope content to all second audience clients of all the audiences in the target live broadcast room; receiving a red envelope receiving instruction sent by the second audience client in response to the red envelope display instruction; and determining a target second audience client in response to the red envelope receiving instruction, sending red envelope content to an audience account corresponding to the target second audience client, and sending the red envelope content to the target second audience client for displaying.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Modules involved in the embodiments of the present disclosure may be implemented by software or hardware. Names of the modules do not limit the modules in a certain case. For example, the first receiving module may be described as "a module receiving a red envelope sending instruction sent from a first audience client".

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable storage medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments of the present disclosure, a live broadcast room red envelope processing method is provided according to a first example. The method is applied to a server. The method includes: receiving a red envelope sending instruction sent by a first audience client, where the red envelope sending instruction includes a red envelope receiving object, red envelope information and a target live broadcast room where the first audience client is located; determining red envelope content according to the red envelope information; sending, in a case that it is determined that the red envelope receiving object is all the audiences in the target live broadcast room, a red envelope display instruction generated according to the red envelope content to all second audience clients of all the audiences in the target broadcast room; receiving a red envelope receiving instruction sent by the second audience client in response to the red envelope display instruction; and determining a target second audience client in response to the red envelope receiving instruction, sending red envelope content to an audience account corresponding to the target second audience client, and sending the red envelope content to the target second audience client for displaying.

According to one or more embodiments of the present disclosure, a method similar to that in the first example is provided according to a second embodiment. The red envelope information includes a type and the number of virtual gifts, a virtual currency amount, the number of red envelope and a red envelope type, and the red envelope type includes a random red envelope or an aliquot red envelope. In a case that the number of red envelope is more than one, the red envelope type is a random red envelope and the red envelope information includes virtual gifts, the process of determining red envelope content according to the red envelope information includes: determining virtual currency amounts corresponding to all virtual gift types included in the red envelope information; determining a red envelope receiving sequence number section corresponding to each virtual gift included in the red envelope information according to a descending order of the virtual currency amounts and a pre-set correspondence, where a virtual gift with a greater virtual currency amount corresponds to a red envelope receiving sequence number section with a smaller average sequence number, the red envelope receiving sequence number represents an order of receiving red envelopes, each of the red envelope receiving sequence number corresponds to one red envelope, the pre-set correspondence represents a correspondence between the virtual currency amounts ranked in the descending order and red envelope receiving sequence number sections, the red envelope receiving sequence number sections are generated according to the number of red envelope included in the red envelope information; and randomly allocating virtual gifts included in each of the red envelope receiving sequence number section to red envelopes corresponding to each red envelope receiving sequence number in the red envelope receiving sequence number section.

According to one or more embodiments of the present disclosure, a method similar to that in the second example is provided according to a third example. In a case that the number of red envelopes is more than one, the red envelope type is a random red envelope, and the red envelope information includes a virtual currency amount, the process of determining red envelope content according to the red envelope information includes: randomly allocating the virtual currency to the red envelopes according to the virtual currency amounts.

According to one or more embodiments of the present disclosure, a method similar to that in the first example to the third example is provided according to a fourth example. The method further includes: in a case that it is determined that the red envelope receiving object is an anchor of the target live broadcast room, sending the red envelope content to an account of the anchor of the target live broadcast room, and sending the red envelope content to the second audience client in the target live broadcast room for displaying.

According to one or more embodiments of the present disclosure, a method similar to that in the first example to the third example is provided according to a fifth example. The method further includes: in a case that it is determined that the red envelope receiving object is a specified audience of the target live broadcast room, sending the red envelope content to an account of the specified audience, and sending the red envelope content and a nickname of the specified audience to the second audience client of the target live broadcast room for displaying.

According to one or more embodiments of the present disclosure, a method similar to that in the first example to the third example is provided according to a sixth embodiment. The red envelope display instruction generated according to the red envelope content includes red envelope receiving waiting time. The red envelope receiving waiting time indicates a time period ranging from a time instant when the second audience client receives the red envelope display instruction to a time instant when the second audience client sends the red envelope receiving instruction in response to input of the audience.

According to one or more embodiments of the present disclosure, a live broadcast room red envelope processing apparatus is provided according to a seventh example. The apparatus is applied to a server. The apparatus includes: a first receiving module, a determining module, a sending module, a second receiving module and a first processing module. The first receiving module is configured to receive a red envelope sending instruction sent by a first audience client. The red envelope sending instruction includes a red envelope receiving object, red envelope information and a target live broadcast room where the first audience client is located. The determining module is configured to determine red envelope content according to the red envelope information. The sending module is configured to send, if it is determined that the red envelope receiving object is all audiences in the target live broadcast room, a red envelope display instruction generated according to the red envelope content to all second audience clients of all audiences in the target live broadcast room. The second receiving module is configured to receive a red envelope receiving instruction sent by the second audience client in response to the red envelope display instruction. The first processing module is configured to determine a target second audience client in response to the red envelope receiving instruction, send red envelope content to an audience account corresponding to the target second audience client, and send the red envelope content to the target second audience client for displaying.

According to one or more embodiments of the present disclosure, an apparatus similar to that in the seventh example is provided according to an eighth example. The red envelope information includes: a type of virtual gift, the number of the virtual gift, a virtual currency amount, the number of red envelopes and a red envelope type. The red envelope type includes a random red envelope and an aliquot red envelope. In a case that the number of red envelopes is more than one, the red envelope types is a random red envelope and the red envelope information includes a virtual gift, the determining module includes: a first determining sub-module, a second determining sub-module and a first allocating sub-module. The first determining sub-module is configured to determine virtual currency amounts corresponding to all virtual gift types included in the red envelope information. The second determining sub-module is configured to determine, according to a descending order of the virtual currency amounts and a pre-set correspondence, a red envelope receiving sequence number section corresponding to each virtual gift included in the red envelope information. A virtual gift with a greater virtual currency amount corresponds to a red envelope receiving sequence number section with a smaller average sequence number. The red envelope receiving sequence number represents an order of receiving red envelopes. Each red envelope receiving sequence number corresponds to one red envelope. The pre-set correspondence indicates a correspondence between the virtual currency amount ranked in a descending order and the red envelope receiving sequence number sections. The red envelope receiving sequence number sections are generated according to the number of red envelopes included in the red envelope information. The first allocating sub-module is configured to randomly allocate the virtual gifts included in each red envelope receiving sequence number section to the red envelopes corresponding to each red envelope receiving sequence number in the red envelope receiving sequence number section.

According to one or more embodiments of the present disclosure, a computer readable storage medium storing computer programs is provided according to a ninth example. The computer programs are executed to perform the methods described in any of the first example to the sixth example.

According to one or more embodiments of the present disclosure, an electronic device is provided according to a tenth example. The electronic device includes a memory and a processor. The memory stores computer programs. The processor is configured to execute the computer programs stored in the memory, to perform the methods described in any of the first example to the sixth example.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims. For the apparatus embodiments, operations of the various modules have been described in detail in the related method embodiments, and details are not described herein.

What is claimed is:

1. A live broadcast room red envelope processing method, applied to a server, the method comprising:

receiving a red envelope sending instruction sent by a first audience client, wherein the red envelope sending instruction comprises a red envelope receiving object, red envelope information and a target live broadcast room where the first audience client is located;

determining red envelope content according to the red envelope information, wherein when a number of red envelopes is greater than one, a red envelope type is a random red envelope, and the red envelope information comprises virtual gifts, the determining red envelope content according to the red envelope information further comprises:

determining a red envelope receiving sequence number section corresponding to each virtual gift comprised in the red envelope information, each red envelope receiving sequence number represents an order of receiving red envelopes, each red envelope receiving sequence number corresponds to one red envelope, and randomly allocating virtual gifts in each red envelope receiving sequence number section to red envelopes corresponding to red envelope receiving sequence numbers in each red envelope receiving sequence number section;

sending, in a case that it is determined that the red envelope receiving object is all the audiences in the target live broadcast room, a red envelope display instruction generated according to the red envelope content to all second audience clients of all the audiences in the target live broadcast room;

receiving a red envelope receiving instruction sent by the second audience client in response to the red envelope display instruction; and determining a target second audience client in response to the red envelope receiving instruction, sending red envelope content to an audience account corresponding to the target second audience client, and sending the red envelope content to the target second audience client for displaying.

2. The method according to claim 1, wherein when the red envelope information comprises virtual currency amounts, the determining red envelope content according to the red envelope information comprises:

randomly allocating virtual currency to the red envelopes according to the virtual currency amounts.

3. The method according to claim 1, further comprising:
in a case that it is determined that the red envelope receiving object is an anchor of the target live broadcast room, sending the red envelope content to an account of the anchor of the target live broadcast room, and sending the red envelope content to the second audience client in the target live broadcast room for displaying.

4. The method according to claim 1, further comprising:
in a case that it is determined that the red envelope receiving object is a specified audience in the target live broadcast room, sending the red envelope content to an account of the specified audience, and sending the red envelope content and a nickname of the specified audience to the second audience client in the target live broadcast room for displaying.

5. The method according to claim 1, wherein the red envelope display instruction generated according to the red envelope content comprises red envelope receiving waiting time, and the red envelope receiving waiting time indicates a time period ranging from a time instant when the second audience client receives the red envelope display instruction to a time instant when the second audience client sends the red envelope receiving instruction in response to input of an audience.

6. A live broadcast room red envelope processing apparatus, applied to a server, the apparatus comprising:
a memory storing computer programs; and
a processor configured to execute the computer programs stored in the memory, to implement operations comprising:
receiving a red envelope sending instruction sent by a first audience client, wherein the red envelope sending instruction comprises a red envelope receiving object, red envelope information and a target live broadcast room where the first audience client is located;
determining red envelope content according to the red envelope information, wherein when a number of red envelopes is greater than one, a red envelope type is a random red envelope, and the red envelope information comprises virtual gifts, the determining red envelope content according to the red envelope information further comprises:

determining a red envelope receiving sequence number section corresponding to each virtual gift comprised in the red envelope information, each red envelope receiving sequence number represents an order of receiving red envelopes, each red envelope receiving sequence number corresponds to one red envelope, and randomly allocating virtual gifts in each red envelope receiving sequence number section to red envelopes corresponding to red envelope receiving sequence numbers in each red envelope receiving sequence number section;

sending, in a case that it is determined that the red envelope receiving object is all the audiences in the target live broadcast room, a red envelope display instruction generated according to the red envelope content to all second audience clients of all the audiences in the target live broadcast room;

receiving a red envelope receiving instruction sent by the second audience client in response to the red envelope display instruction; and determining a target second audience client in response to the red envelope receiving instruction, send red envelope content to an audience account corresponding to the target second audience client, and send the red envelope content to the target second audience client for displaying.

7. The apparatus according to claim 6, wherein the processor configured to execute the computer programs stored in the memory, to implement operation comprising:
randomly allocating virtual currency to the red envelopes according to the virtual currency amounts.

8. The apparatus according to claim 6, wherein the processor configured to execute the computer programs stored in the memory, to implement operation comprising:
in a case that it is determined that the red envelope receiving object is an anchor of the target live broadcast room, sending the red envelope content to an account of the anchor of the target live broadcast room, and sending the red envelope content to the second audience client in the target live broadcast room for displaying.

9. The apparatus according to claim 6, wherein the processor configured to execute the computer programs stored in the memory, to implement operation comprising:
in a case that it is determined that the red envelope receiving object is a specified audience in the target live broadcast room, sending the red envelope content to an account of the specified audience, and sending the red envelope content and a nickname of the specified audience to the second audience client in the target live broadcast room for displaying.

10. The apparatus according to claim 6, wherein the red envelope display instruction generated according to the red envelope content comprises red envelope receiving waiting time, and the red envelope receiving waiting time indicates a time period ranging from a time instant when the second audience client receives the red envelope display instruction to a time instant when the second audience client sends the red envelope receiving instruction in response to input of an audience.

11. A non-transitory computer readable medium storing computer programs, wherein the computer programs are executed by a processor to perform operations comprising:
receiving a red envelope sending instruction sent by a first audience client, wherein the red envelope sending instruction comprises a red envelope receiving object, red envelope information and a target live broadcast room where the first audience client is located;
determining red envelope content according to the red envelope information, wherein when a number of red envelopes is greater than one, a red envelope type is a random red envelope, and the red envelope information comprises virtual gifts, the determining red envelope content according to the red envelope information further comprises:
determining a red envelope receiving sequence number section corresponding to each virtual gift comprised in the red envelope information, each red envelope receiving sequence number represents an order of receiving red envelopes, each red envelope receiving sequence number corresponds to one red envelope, and
randomly allocating virtual gifts in each red envelope receiving sequence number section to red envelopes corresponding to red envelope receiving sequence numbers in each red envelope receiving sequence number section;
sending, in a case that it is determined that the red envelope receiving object is all the audiences in the target live broadcast room, a red envelope display instruction generated according to the red envelope content to all second audience clients of all the audiences in the target live broadcast room;
receiving a red envelope receiving instruction sent by the second audience client in response to the red envelope display instruction; and
determining a target second audience client in response to the red envelope receiving instruction, sending red envelope content to an audience account corresponding to the target second audience client, and sending the red envelope content to the target second audience client for displaying.

* * * * *